United States Patent [19]
Steinberg et al.

[11] Patent Number: 6,151,073
[45] Date of Patent: *Nov. 21, 2000

[54] INTELLIGENT CAMERA FLASH SYSTEM

[75] Inventors: Eran Steinberg, San Francisco; Hari Vasudev, Sunnyvale; Sumat Mehra, Milpitas, all of Calif.

[73] Assignee: FotoNation, Inc., San Francisco, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/624,972

[22] Filed: Mar. 28, 1996

[51] Int. Cl.$^7$ .......................... H04N 5/222; H04N 5/238
[52] U.S. Cl. ............................................ 348/371; 348/364
[58] Field of Search ..................... 348/224, 364, 348/366, 370, 371; 396/164, 173, 166, 165

[56] References Cited

U.S. PATENT DOCUMENTS

| | | | |
|---|---|---|---|
| 4,066,884 | 1/1978 | Taylor | 362/16 |
| 4,256,995 | 3/1981 | Ishida | 315/241 |
| 4,535,758 | 8/1985 | Longacre, Jr. | 128/6 |
| 4,549,801 | 10/1985 | Winter | 354/403 |
| 4,717,934 | 1/1988 | Kobayashi et al. | 354/415 |
| 4,954,861 | 9/1990 | Nagaoka et al. | 354/403 |
| 4,969,007 | 11/1990 | Otani et al. | 354/413 |
| 4,998,127 | 3/1991 | Bell | 396/165 |
| 4,998,128 | 3/1991 | Coltman et al. | 354/415 |
| 5,001,552 | 3/1991 | Okino | 358/29 |
| 5,019,911 | 5/1991 | Okino et al. | 358/29 |
| 5,034,662 | 7/1991 | Nishida et al. | 315/241 |
| 5,036,400 | 7/1991 | Haruki | 348/364 |
| 5,065,232 | 11/1991 | Kondo | 358/29 |
| 5,168,300 | 12/1992 | Yasukawa | 396/165 |
| 5,172,157 | 12/1992 | Takagi | 354/415 |
| 5,194,960 | 3/1993 | Ota | 358/228 |
| 5,309,243 | 5/1994 | Tsai | 348/364 |
| 5,438,367 | 8/1995 | Yamamoto et al. | 348/371 |
| 5,860,029 | 1/1999 | Ichikawa et al. | 396/164 |
| 5,929,908 | 7/1999 | Takahashi | 348/364 |

*Primary Examiner*—Wendy Garber
*Assistant Examiner*—Alicia M. Harrington
*Attorney, Agent, or Firm*—David H. Jaffer

[57] ABSTRACT

An intelligent flash system for a digital camera having components including an image optical pickup, an interface circuit, a flash unit and a processor. Upon activation of the camera, ambient lighting conditions are evaluated and if flash energy is required, a first low energy pre-flash is radiated, the reflected light received by the optical pickup having a multiplicity of pixels, and the output of the pixels converted to image intensity data by the interface circuit. The processor samples the image intensity data, weighing the center image area more heavily, and creates a histogram plot of quantity of pixels v.s. intensity, and separates the plot into a bar graph from which a determination of exposure is obtained. The histogram is then used to calculate a multiplicative scaling factor used to multiply the first flash energy to an estimate of a flash energy for correct exposure. Conditions of extreme over and under exposure result in the activation of a second flash at an adjusted energy level. The image data of the second flash is then analyzed and the exposure compared with the result of the first flash. A final determination of flash energy is then made based upon the results.

4 Claims, 9 Drawing Sheets

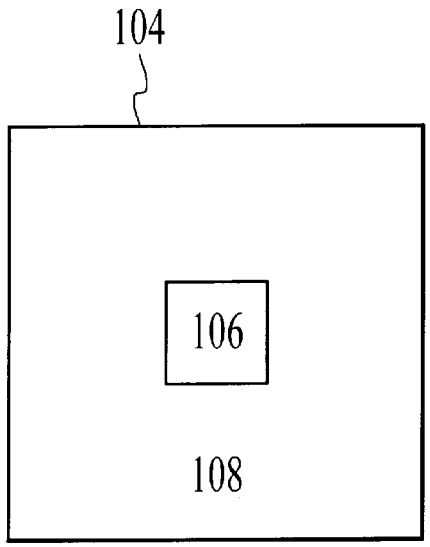
FIG. 4A
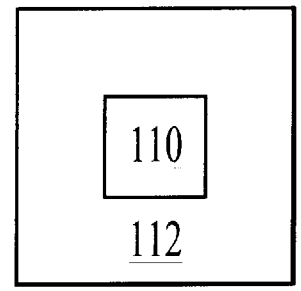
FIG. 4B
| 500 | 400 | 300 | 200 | 200 |
|---|---|---|---|---|
| 600 | 300 | 400 | 500 | 300 |
| 400 | 300 | 600 | 700 | 400 |
| 200 | 500 | 800 | 700 | 300 |
| 100 | 200 | 300 | 400 | 200 |
FIG. 5

| QTY | Original Intensity | Scaled Intensity |
|---|---|---|
| 1 | 100 | 106.25 |
| 5 | 200 | 212.50 |
| 6 | 300 | 318.75 |
| 5 | 400 | 425.00 |
| 3 | 500 | 531.25 |
| 2 | 600 | 637.50 |
| 2 | 700 | 743.75 |
| 1 | 800 | 850.00 |
| 0 | 900 | |
| 0 | 1000 | |

INTELLIGENT CAMERA FLASH SYSTEM

BACKGROUND OF THE INVENTION

1. Field of the Invention

The present invention relates generally to electronic digital cameras, and more particularly to a digital camera using a pre-flash in combination with digital camera image acquisition apparatus and a processor for creating a histogram to determine an optimum flash power controlled through calculation of flash capacitor voltage.

2. Brief Description of the Prior Art

Prior art cameras have used many different techniques to achieve optimum exposure, from hand held light meters to built in automatic exposure systems with flash. One method of controlling exposure is based on "through the lens" flash control in which the flash is terminated when sufficient light is collected by a photo receptor in the camera. Another method uses an infrared photo diode to measure the light. The advantage of using infrared is that in the infrared zone, light is more evenly reflective as a function of color in the visible spectrum. These methods are all based on an average (integration) over the entire image, and are not able to separate out important image areas for priority in setting the amount of light for exposure. For example, a combination of a close image and a distant background will result in a "washed out" foreground. Since primary subjects are often in the foreground, this is a serious problem in automatic exposure systems. These exposure control systems also require a very fast electronic switching device for a fast flash and a separate photo receptor which add complexity and cost to the system. The infrared receptor also has a problem in that the light measured is only a monochromatic estimation of the scenery. This estimation may be close in some cases, but in others, it accentuates the problem of film/CCD metamerism, a condition where different wavelengths in a scene are improperly recorded.

In Coltman et al., U.S. Pat. No. 4,998,128 the reflectivity of a subject is determined by pulsing a flash unit for predetermined short period of time. The light is detected by both visible and infrared light detectors, the outputs of which are integrated and used to select an optimum aperture and speed setting for taking the picture. In Taylor, U.S. Pat. No. 4,066,884 an adjustable filter is used to vary the light intensity from an electronic flash unit, the degree of adjustment being empirically determined for a particular type of camera, in this case cameras designed for use with explosive flashbulbs which have relatively long duration of light intensity. The problem with the electronic flash unit when used with cameras having automatic exposure adjustment is that the time duration of the electronic flash is too short for the automatic exposure system to work. In Winter, U.S. Pat. No. 4,549,801, an electrically operated flash camera employs an infrared flash reflected light signal stored in a single memory storage to control focus and aperture. In Ishida, U.S. Pat. No. 4,256,995, an electronic flash is disclosed which is capable of emitting light for a longer duration of time so as to allow automatic exposure control camera systems to function. Kabayashi et al., U.S. Pat. No. 4,717,934 discloses a flash used prior to image acquisition to determine the amount of flash required for an adequate exposure. This is done by detecting and integrating light radiated directly from the flash, and integrating the reflected light from the object. The flash power is provided by a separate capacitor from the capacitor used for the main flash.

In Coltman, the pre-flash system functions independently from the camera image acquisition apparatus, depending on a predetermined look up table. The accuracy of this method is limited to the exactness of the correlation between the look up table and the actual setting. The mechanical adjustment device of Taylor for control of the flash intensity is dependent on the skill of the operator in knowing where to set the flash cover. In Winter, the burden of adjusting for exposure is placed entirely on the camera aperture and shutter speed. No attempt is made to control the amount of flash. The device of Ishida similarly does not use control of the flash time as an aid in achieving proper exposure but simply provides a flash of long duration, allowing conventional camera automatic exposure systems to function as if the lighting were ambient. This system would consume larger amounts of flash power than what would otherwise be required for proper exposure. The device of Kabayashi requires a separate capacitor for pre-flashing, which involves extra cost and space.

It is apparent from the above references that an improved camera is desirable, that conserves flash power and minimizes cost and space. Also, an improved camera would provide a method for evaluating light from different parts of an image to determine optimum exposure of particularly selected areas, this being a particular problem when objects are at various distances from the camera and when they are in contrast to each other. Such a camera would be a significant improvement over the prior art.

SUMMARY OF THE INVENTION

It is therefore an object of the present invention to provide an improved digital camera having provision for determining optimum flash energy for illumination of a selected area of an image.

It is a further object of the present invention to provide an improved digital camera using reduced energy flash illumination to determine optimum full flash energy.

It is another object of the present invention to provide an improved digital camera having a flash system providing a series of lower power flashes prior to a final flash utilizing a single capacitor and providing for optimum use of flash energy.

It is another object of the present invention to provide an improved digital camera that uses the image acquisition apparatus to determine optimum camera exposure parameters from a low energy flash prior to a final flash.

It is a further object of the present invention to provide a camera having a method of estimating an acquired image from data collected from low energy pre-flashes.

It is a still further object of the present invention to provide a camera that determines flash exposure based on center weight subsampling.

It is another object of the present invention to provide a method for determining the energy of sequential flashes (strobes) based on the discharge curve of the flash capacitor in a digital camera.

It is a further object of the present invention to provide a method of determining flash exposure based on samplings of an image luminous histogram.

Briefly, a preferred embodiment of the present invention includes an intelligent flash system for a digital camera having components including an image optical pickup, an interface circuit, a flash unit and a processor. Upon activation of the camera, ambient lighting conditions are evaluated and if flash energy is required, a first low energy flash is radiated, the reflected light received by the optical pickup having a multiplicity of pixels, and the output of the pixels converted to image intensity data by the interface circuit. The processor samples the image intensity data, weighing the center image area more heavily, and creates a histogram plot of quantity of pixels v.s. intensity, and separates the plot into a bar graph from which a determination of exposure is obtained. The histogram is then used to calculate a multiplicative scaling factor used to multiply the first flash energy as an estimate of a final flash energy for correct exposure. Conditions of extreme over and under exposure result in the activation of a second flash at an adjusted energy level. The image data of the second flash is then analyzed and the exposure compared with the result of the first flash. A final determination of flash energy is then made based upon the results.

An advantage of the present invention is the provision of a flash system for a digital camera that provides optimum flash energy.

A further advantage of the present invention is that it provides a flash system that uses reduced energy flashes in the determination of exposure, thus conserving total flash energy.

Another advantage of the present invention is the provision of a flash system that conserves flash energy and operates from a single flash capacitor.

A further advantage of the present invention is the use of the image acquisition optics to determine exposure, thus providing increased accuracy and a reduced parts cost.

It is a further advantage of the present invention to provide a flash system that determines exposure based on center weight sampling, giving greater importance in exposure determination to a more important area of the image.

IN THE DRAWINGS

FIG. 4A is a sample image area illustrating the selection of a selection of a preferred object area;

FIG. 4B illustrates the weighted sampling of the preferred object area of FIG. 3A;

FIG. 5 is a simplified array of pixel intensities;

DESCRIPTION OF THE PREFERRED EMBODIMENT

Figure 1:
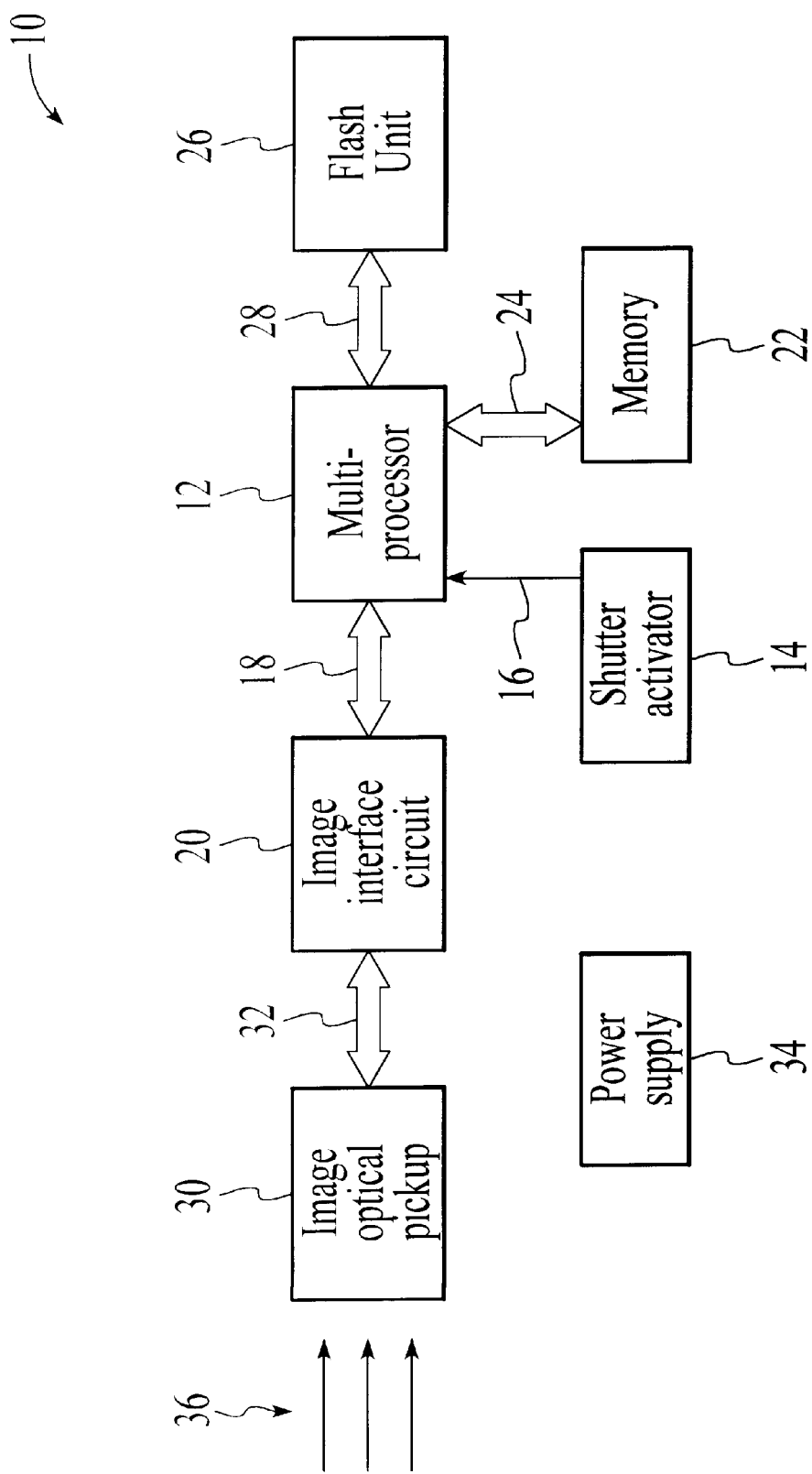
FIG. 1 shows a block diagram of a digital camera according to the present invention.

A typical camera system in which the method and apparatus of the present invention is employed is shown in FIG. 1, wherein a digital camera 10 is illustrated having a multiprocessor 12 activated by shutter activator 14 through line 16, and communicating through bus 18 with image interface circuit 20. The multiprocessor further communicates with memory 22 through bus 24 and interconnects with the flash unit 26 through bus 28. Image optical pick-up 30 is interconnected to the image interface circuit 20 through bus 32. A power supply 34 is shown for providing electrical energy to the various circuit components through lines not shown.

In response to the shutter activator 14, light 36 from an image to be recorded is received by the image optical pick-up 30 and sent via bus 32 to the image interface circuit 20 which communicates with the pick-up 30 and processor 12 to provide digital image intensity data corresponding to the light 36. Further details of the pick-up 30 and circuit 20 are not necessary for an understanding of the present invention. Those skilled in the art of digital cameras will know how to fabricate the light to digital data apparatus.

Figure 2:
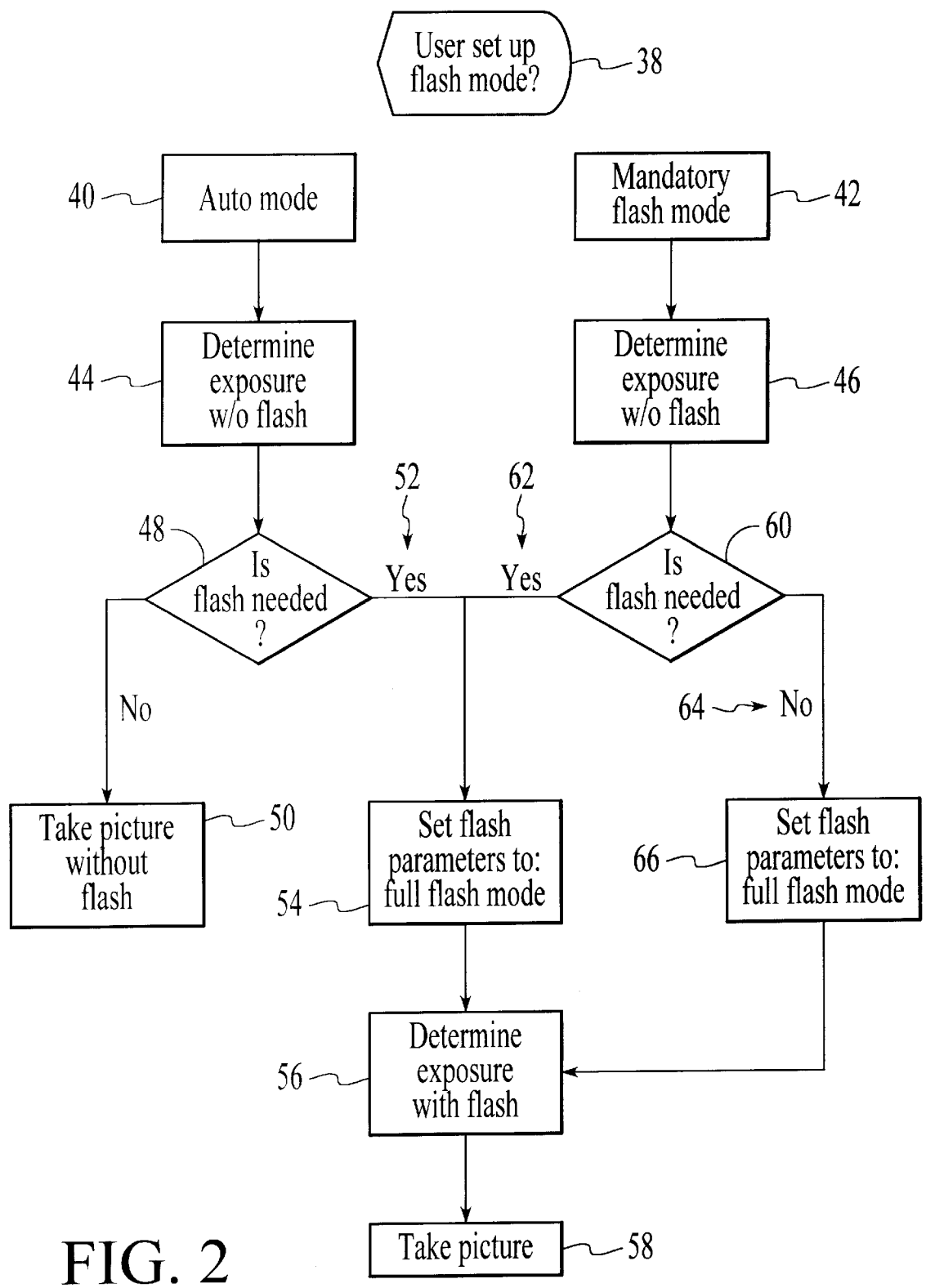
FIG. 2 is an overall block diagram of the intelligent flash system.

According to FIG. 2, a user can select (block 38) one of two modes, including an AUTO MODE (block 40) or a MANDATORY FLASH MODE (block 42). In either of the two modes, Auto or Mandatory Flash, the processor 12 is configured to respond to the activator 14 by sampling and analyzing the ambient light (blocks 44 and 46) to determine if it is adequate. In the Auto Mode, if the ambient light is found (block 48) to be adequate, the picture is taken without a flash (block 50). If the ambient light is not adequate and a flash is needed (52) the camera parameters (block 54) are set for what is defined as a "full flash mode" at which point the flash is adjusted for optimum exposure and the picture is taken (block 56). This process includes a series of one or more flashes applied to determine an optimum flash energy for proper exposure. The first flash is preset at a lower energy generally considered to result in "under" exposure. If the light from the first flash is adequate for an analysis, the image is analyzed and an estimate of a proper flash energy for a correct exposure is made and the picture is taken at this flash energy. If the light from the first flash is not sufficient for an analysis, a second flash is activated at a higher energy level. The preferred embodiment provides for a maximum of two flashes prior to a flash activated to take a picture. Alternate embodiments however can use any number of flashes prior to the final flash. When sufficient light for an analysis is provided by a flash, the processor 12 scales the flash energy level to determine an estimated flash energy level for correct exposure and the camera takes the picture at this energy level.

In the preferred embodiment, if the second flash energy level is insufficient for an analysis, i.e. resulting in either extreme under or over exposure, no further analysis is done. The picture is then taken (block 58) at a minimum flash energy level if the second flash caused extreme over exposure or at a maximum flash energy level if the result of the second flash was extreme under exposure.

The mandatory flash mode 42 results in the use of a flash regardless of the ambient lighting conditions, the purpose being to use the flash to fill shadows, such as on a subject person's face caused by bright sunlight. If the evaluation of ambient light (46) results in a determination (60) that a flash is needed (62), the camera parameters are set (54) as described above and the process continues according to the operations defined for blocks 56 and 58. If the ambient light is adequate, camera parameters are set 66 to reduce the ambient light input to the camera. The parameter adjustments in this case could include an increase in speed and/or a reduction in the camera aperture. The correct flash power is then determined and the picture is taken as explained above according to the operations associated with blocks 56 and 58.

The deliberate use of a low energy first flash is for the purpose of conserving flash capacitor energy so that the flash capacitor will subsequently have enough energy for a proper final flash without recharging. This method saves energy and eliminates the need for a separate flash capacitor for the flashes prior to the final flash.

Referring again to FIG. 1, the light 36 from the flash is reflected from an object, received by the pick-up 30 and converted to a multiplicity of analog signals, each corresponding to one pixel in an array. These analog signals are then processed into digital image intensity data by the circuit 20 and sent to the processor 12. This process of conversion of the light to image intensity data will be termed "grabbing the image" in the following text.

A more detailed description of the process of analyzing the image to determine exposure and a proper final flash will now be given. This description is somewhat complicated in the fact that the process is generally applicable to the two sources of light, i.e. from ambient or other secondary light and from a flash, as indicated in blocks 44, 46 and 56. In order to avoid having to repeat a lengthy description, the following analysis will generally apply to both situations, with emphasis on the use of flash energy. The differences will be explained as the description proceeds.

In general, the camera 10 responds to the low energy first flash, or to a first ambient light sample by grabbing a first image (or first ambient image to distinguish the use of ambient light) and creating first image intensity (or first ambient image intensity) data. The processor 12 then constructs a first histogram and first bar graph from sampled first image intensity data, and from an analysis of this data determines a first degree of exposure, i.e. whether the object needs more or less light or whether the exposure is correct. In the above, the terminology generally also applies to an ambient/secondary light source. The terminology can be distinguished from the use of flash energy by replacing the terms first histogram, first bar graph and first degree of exposure with first ambient histogram, first ambient bar graph and first ambient degree of exposure. These distinctions will now be implied in the following descriptions without repetitiously making note of them.

If the amount of light (first degree of exposure) is correct, a second flash or sampling is bypassed and the first flash energy level (or camera parameters for ambient light) is used to take the picture. In the case of ambient light (blocks 44 or 46), an automatic adjustment of camera parameters (speed, F-stop) would be made if the degree of exposure were not adequate. If the exposure is adequate, the picture is taken with ambient light and original parameters. If the exposure is not correct, but a meaningful histogram was created in the analysis, i.e., if the image was not greatly over or under exposed, a scaling procedure is performed on the sampled first image intensity data. This scaling procedure is performed by the processor by finding a first scaling factor to the first sampled intensity data so as to cause a predetermined percentage (0.5% preferred) of the pixels to be above the saturation value of the image optical pickup (preferably a CCD). This scaling is accomplished by multiplying the sampled first image intensity data by the first scaling factor and reconstructing and re-analyzing the histogram to determine the number of pixels with intensities exceeding the saturation value. Upon finding the proper scaling factor in the case when the camera is analyzing an image from a flash, the processor uses this factor as an energy scaling factor, by which to multiply the first flash energy level to obtain an estimated correct final flash energy level. The picture is then taken with this estimated final flash energy. If the light source is ambient with no flash, the scaling factor is used with a look-up table or as an appropriate factor to determine an adjusted set of camera parameters. If the result from ambient light is a condition of extreme under exposure to such an extent that no camera speed or aperture adjustment will correct it, the camera automatically shifts to the full flash mode (block 54) and the above process is activated-as described in relation to the use of a first and second flash.

In either the case of ambient or flash light sources, the above described scaling is not performed if the degree of exposure is extremely under exposed (low clipping) or extremely over exposed (high clipping), since a meaningful histogram cannot then be prepared. If a meaningful histogram is not obtained from the first flash, due to either extreme under exposure (low clipping) or extreme over exposure (high clipping), a second flash at a second flash energy level is activated, the second flash energy level being at an adjusted fraction of the first flash. If the first degree of exposure is extremely under exposed (low clipping), the second flash energy level is adjusted to a greater energy level. If the first degree of exposure is extremely over exposed (high clipping), the second flash energy level is adjusted to a lower energy level. A second image of the object is then grabbed, and second image intensity data is created from which sampled second image intensity data is taken and a second histogram and second bar graph are created therefrom. The second histogram and second bar graph are then analyzed and a second degree of exposure determined. If high or low clipping are still occurring, the flash energy is minimized or maximized respectively and a picture is taken. If the exposure is correct, the flash is again activated at the second flash energy level to take the picture. In the case of under or over exposure, i.e., moderate under or over exposure not resulting in clipping, a second scaling factor is determined and used as a multiplicative scaling factor on the second flash energy to determine an estimated correct final flash energy. The use of the term "under exposure" and "over exposure" in the following text will generally indicate moderate "over" or "under" exposure, rather than extreme under or over exposure which will be alternatively termed low and high clipping. The above description using a maximum of two flashes prior to a final flash is the preferred embodiment, however, alternate embodiments include any number of flashes prior to a final flash and are included in the invention.

Figure 3:
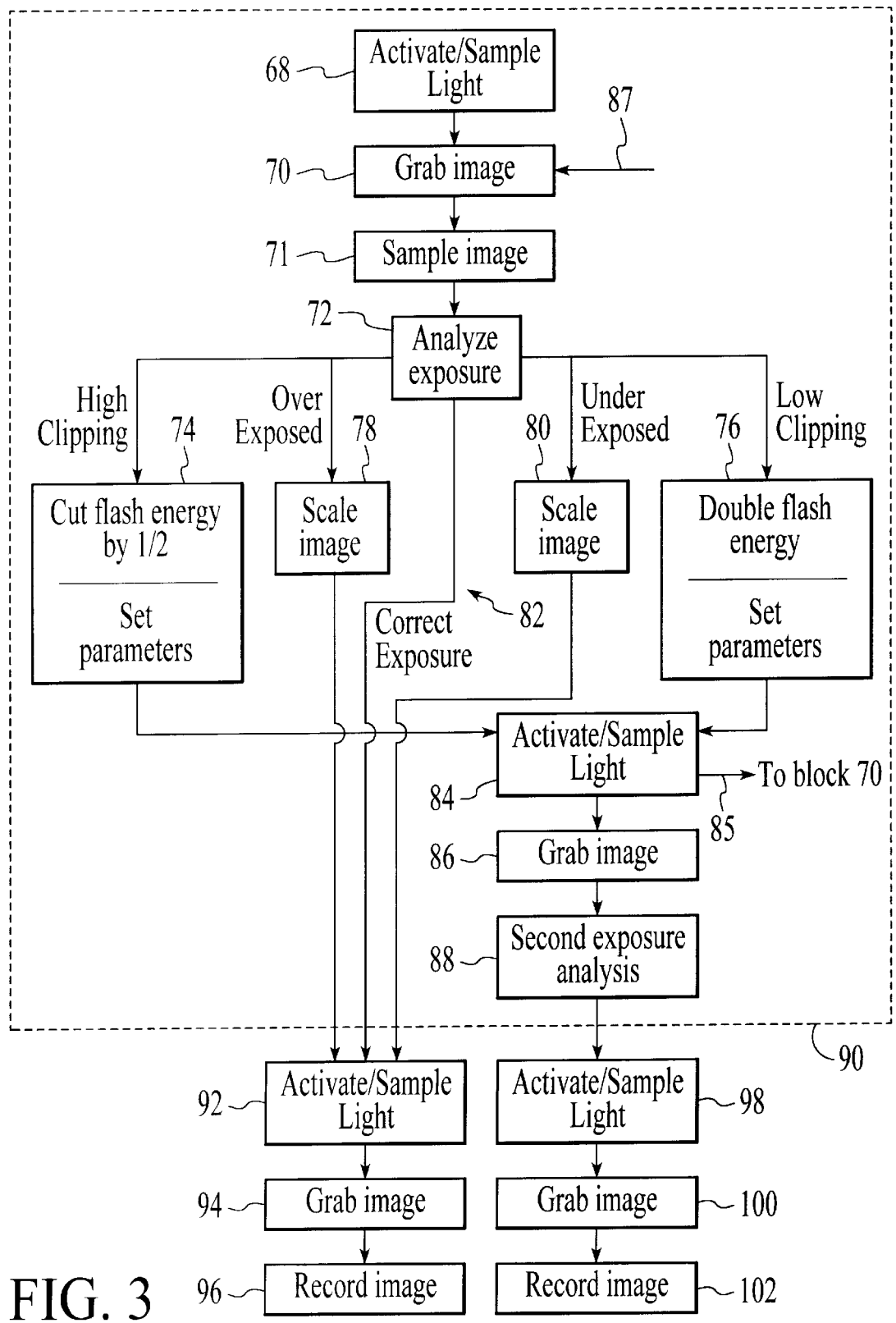
FIG. 3 is a block diagram showing further details of the method of achieving correct exposure.

The operation described in FIG. 2 can be more fully understood through reference to FIG. 3. The blocks 68–88 included in block 90 give added detail to the operation of blocks 44–48, and 52–66 in FIG. 2. This determination of exposure in blocks 44 and 46 of FIG. 2 uses ambient light as the light sources. Block 56 uses a flash. In FIG. 3, block 90 more fully describes the activity of determining the exposure. Block 68 indicates the activation of the light source, which is either a flash or a sampling of ambient light.

The image is then grabbed (block 70) i.e., detected by the optical pick-up 30 (FIG. 1) and processed by the interface circuit 20 to digital image intensity data. The image intensity data is then analyzed to determine a degree of exposure. This analysis involves the following operations in blocks 71 and 72 including sampling of the image intensity data in a selective manner (block 71) in order to weigh more heavily the data representing the primary object area. This area is usually considered to be near the center of the image, and such sampling is to be considered part of the preferred embodiment; however, the processor 12 could be programmed to weigh other areas more heavily and they are included in the spirit of the invention.

The sampled image data is then analyzed to determine the exposure (block 72), and the activity is directed accordingly. If the condition is extreme overexposure, resulting in high clipping where the large majority of pixels are at the high end of the intensity range, the process is directed to block 74. If the condition is extremely under exposed, the process continues in block 76. Simple over or under exposure not resulting in clipping are directed to blocks 78 and 80 respectively, and if the exposure is correct, activity continues at block 92.

The operations of blocks 74, 76, 78 and 80 all involve calculating either a subsequent flash energy or a subsequent set of camera parameters such as speed and aperture to sample a corrected amount of light to achieve a correct exposure. The calculation is either for a subsequent flash or ambient sample to be analyzed, or a final flash energy level or set of parameters for a final sample of ambient light to take the picture. In the case of severe over exposure the operations indicated by block 74 involve setting parameters to determine the energy of a second flash when a flash is the light source, or re-setting the camera parameters such as speed and aperture if ambient light is the source. For the flash case, block 74 indicates one half of the energy of the first flash, but some other fraction could be used as well. Similarly, if the condition is extremely underexposed (low clipping) where nearly all of the pixel intensities are near the low end of the intensity scale, parameters are set to direct a second flash at higher energy (block 76). Although block 76 indicates doubling the energy, some other factor could be used.

If the condition is merely overexposed i.e. over exposed to a lesser degree and a detailed histogram can be prepared, the image data is adjusted (block 78) by a scaling factor until the histogram shows preferably 0.5% of the intensity data exceeding a predetermined intensity level, at which point the corresponding scaling factor is used to scale down the first flash power, or is used to determine adjusted camera parameters.

If the result of the analysis indicates a similar condition of under exposure to a lesser degree than low clipping so that a histogram can be created (block 80), the processing is similar to the description above for overexposure. The scaling factor for under exposure would be greater than unity, which would increase the flash energy.

If the first flash or ambient light sample results in a correct exposure 82, the processor proceeds directly to block 92 and the flash is activated at a power level equal to the first flash energy, or in the case of ambient light, the same quantity of light is admitted/sampled again.

In the above cases involving over exposure 78, under exposure 80, and correct exposure 82, a second flash or sampling of ambient light is not required. When the analysis shows correct exposure, the corresponding flash energy is again activated or the sampled quantity of ambient/secondary light is again sampled (block 92), the image grabbed 94 and recorded 96. In the cases of high clipping 74 and low clipping 76, either a second flash is activated 84 at an adjusted energy level, or a second ambient light sample is admitted followed by the grabbing of the image 86 and further analysis 88 and decision making in order to arrive at a correct flash energy or setting of camera parameters. In the preferred embodiment, a maximum of two flashes occur before a final flash is activated to take the picture. A larger number of flashes prior to the final flash are also included in the invention and this is indicated by arrows 85 and 87 showing the operations from block 70 to 84 repeated. This repetition can be any number of times according to the programming. For example, smaller increments of flash energy adjustment in blocks 74 and 76 could be used, which could require more repetitions of analysis and adjustment to arrive at a useable flash energy from which to scale (block 78, 80) a final flash energy, or more adjustments of flash energy could be done before a final determination that the minimum or maximum flash energy should be used. Following the operation of block 88, determining optimum flash energy or camera parameters, the light source (flash or ambient/secondary) is activated 98, the image grabbed 100 and recorded 102. This is all indicated by block 88, the details of which will be fully described in the following specification in reference to the figures of the drawing.

The "sample image" block 71 of FIG. 3 is more fully described with reference to FIGS. 4a and 4b. The image optical pick-up 30, such as a charged coupled device (CCD), contains thousands of individual receptors, i.e. pixels (picture elements). An analysis of the output of each of these elements would be a very expensive project, and for this reason the pixels are sampled (block 71). For example, suppose there were 300,000 pixels. In order to bring the analysis down to a more economical level, 1000 of the pixels could be selected from the 300,000. The number of pixels and the following numbers and graphs are given by way of illustration of the method and apparatus of the present invention, and are not to be considered as limiting, since any number of pixels or any sample quantity could apply. In the example selected for illustration, a significantly greater number of pixels are sampled from the center area relative to the edges since the center of the image usually contains the primary subjects of the photography. This selective sampling gives greater weight to the lighting of the more important area of the image. For example, suppose square 104 of FIG. 4 is the total area of an image. For illustration, it is partitioned into a center region 106 and an edge region 108. The camera can be set up to consider the center region 106 as being of greater importance. The area is arbitrarily selected for illustration to contain 4% of the pixels. The camera in this case would then weigh light intensity from the center 106 more heavily than the edge region 108, by sampling a larger number of pixels per unit area from the center region than from the edge region. For example, FIG. 4b represents a weighted sampled image of image 104. The original region 106 is now represented by region 110 occupying 25% of the total sampled image and region 108 represented by sampled region 112 in FIG. 4b. In other words, a particular area of the image can be over sampled in order to weigh it as more important in determining what is a correct exposure. Although the preferred embodiment involves sampling the center region more heavily, alternate embodiments involve sampling more heavily in other areas, or in more than one selected area.

Block 72 of FIG. 3 includes the creation of a histogram and multiple region bar graph from the sampled image data, and evaluation of the degree of exposure as high clip, over exposed, properly exposed, under exposed or low clip. For ease of wording, the terms over exposed and under exposed will generally be used to refer to moderate over or moderate under exposure, and not to include the more severe form of under or over exposure that places pixels at one or the other extreme of the intensity scale. These more severe forms are indicated by the terms low clip and high clip as referred to above, or low clipping and high clipping, or descriptively as extreme under or extreme over exposure.

For ease of illustration of the histogram and bar graph process, suppose the grid of 25 pixels in FIG. 5 is the sampled image intensity data. Also, for simplicity, the light intensity values are assumed to have the range of 1 to 1000. Each square 114 represents one pixel of the sampled image, and has a number assigned which is the value of light intensity of the pixel selected for illustrative purposes. In addition to sampling the image data, the processor 12 further simplifies and speeds calculations by selecting a predetermined number of regions of intensity to create a bar graph to aid in the evaluation instead of evaluating each pixel. For this illustration, suppose the number of regions of light intensity selected is five, the first region being the number of pixels with light intensities of 1–2, the second having values of 3 and 4, the third, 5 and 6, the fourth 7 and 8 and the fifth, 9 and 10.

Figures 6A, 6B:
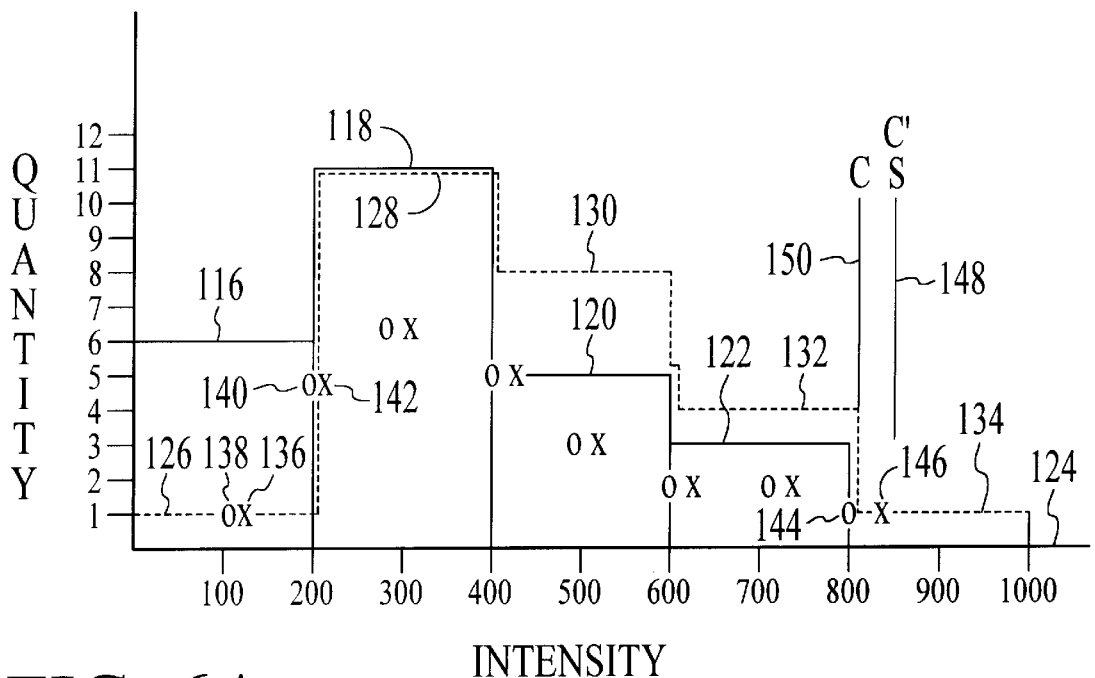
FIG. 6A is a simplified histogram and bar graph based on the image intensity data of FIG. 4.
FIG. 6B is a table of the quantities of pixels and their intensities before and after scaling.

FIG. 6A shows a histogram, i.e., a plot of pixel quantity versus light intensity with the original quantity of each light intensity recorded as small circles. The histogram of "quantities" of pixels with a given intensity versus "intensity" is overlaid by the five region bar graph. Region 1 is represented by bar 116, region 2 by bar 118, region 3 by bar 120, region 4 by bar 122 and region 5 by bar 124. Bar 124 is of zero height because there are no pixels in the corresponding intensity range, which is from intensities greater than 800, up to and including 1000. The height of bar 116 is the number of pixels having intensities from zero to 200, including one pixel at intensity 100 and five at intensity 200, for a total of 6 pixels defining the height of the bar. The other bars are similarly derived. The modified bars 126, 128, 130 and 134 are outlined by dashed lines and are the result of the quantity of pixels having scaled intensity values, the quantities noted by the small x's. The purpose of the scaling is related to scaling in blocks 78, 80 and 88 for the purpose of arriving at a scaling factor, which is used to multiply a previous flash to yield a correct final flash energy. This process will be fully described in the following discussions of the figures of the drawing. For example, the first region after intensity scaling has a quantity of pixels equal to one. The pixel initially had an intensity of 100, which is noted by the "0" identified by item no. 138. After an analysis which will be fully explained, the intensity is multiplied by a scaling factor which moves the position of the quantity notation to the intensity 106.25 indicated by the and identified by item no. 136, thus shifting its position to the right on the intensity scale. The second "0" indicated by item no. 140 indicates a quantity of five pixels with intensity of 200. The scaling shifts this value above the 200 limit of region 1 and into region 2 as noted by the second x identified by item no. 142. Therefore, the new region 1 has only one pixel as indicated by the dashed bar 126. A similar explanation follows for the other regions. Of particular note is region 5 which begins with no pixels, but due to the scaled values moving higher in intensity, the dashed/modified region 5 has one pixel. Note also that because a multiplicative scaling factor was used, the horizontal distance (intensity difference) between the first "0" and the first "x" is much smaller than the intensity difference between the last "0" 144 and last "x" 146. For ease of reference, the quantities of pixels and their intensities before and after scaling are shown in the table of FIG. 6B. The above example will be referred to in the following detailed description of the exposure analysis performed by blocks 72 and the scaling operations performed in blocks 78, 80 and 88.

Figure 7:
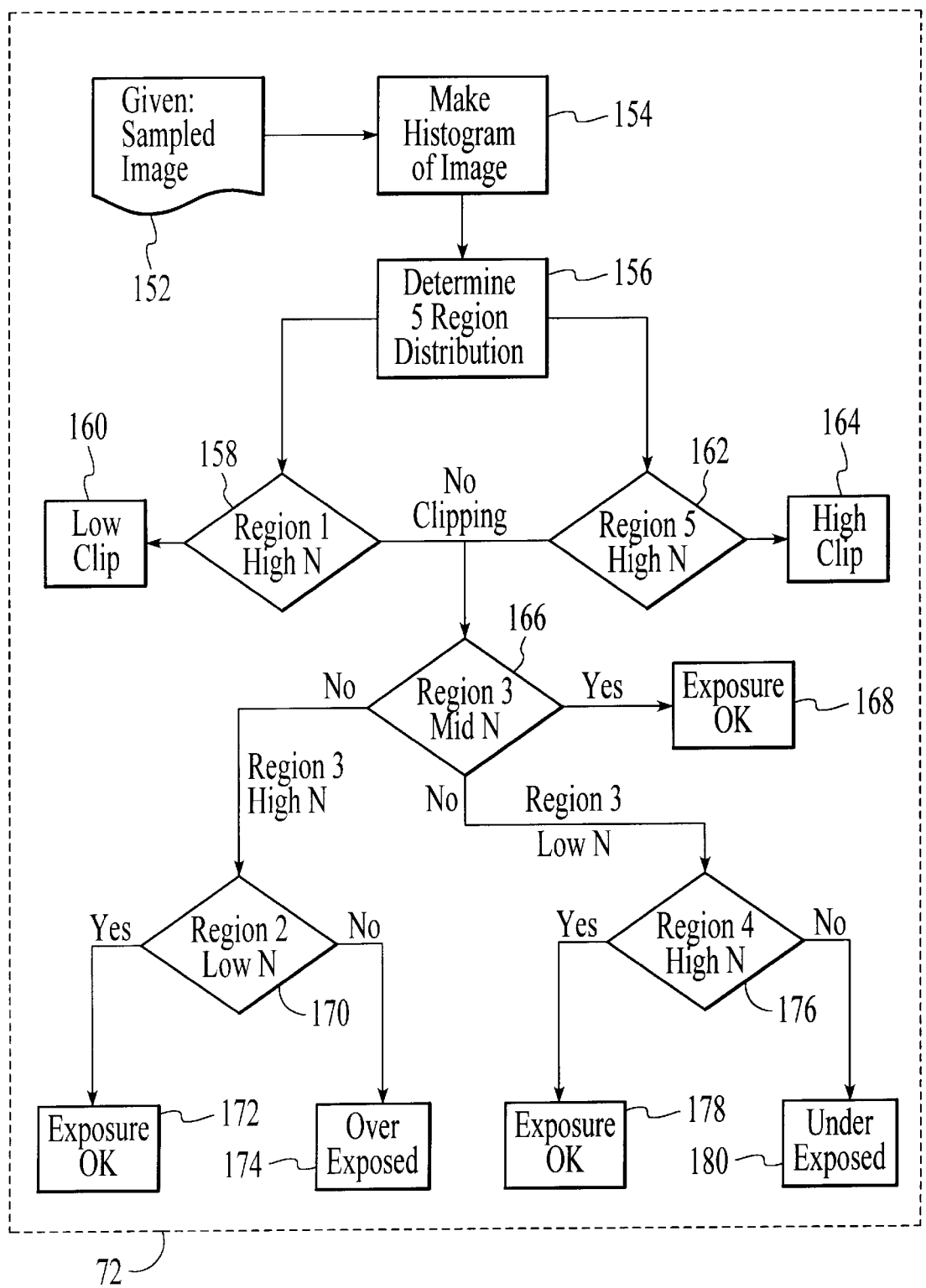
FIG. 7 is a block diagram illustrating the method of exposure determination using the bar graph.

The "analyze exposure" block 72 of FIG. 3 represents the creation and analysis of the bar graph of the actual sampled image intensity data. This analysis can now be more fully understood through reference to FIG. 7. Block 152 indicates the input of the sampled image from block 71 of FIG. 3, and blocks 154 and 156 refer to the making of the histogram and bar graph as explained above in reference to FIGS. 5 and 6. According to block 158, region 1 of the bar graph is evaluated and if it contains more than a preset high value, the exposure condition is termed low clipping (block 160). Similarly, in block 162, region 5 is evaluated and if it contains more than a preset value of pixels the exposure is termed high clipping (block 164). If neither high or low clipping occur, region 3 is evaluated (block 166) and if the number of pixels is found to be within preset upper and lower limits, the exposure is termed to be "ok" (block 168). Otherwise, if region 3 has a high number of pixels exceeding the upper limits, region 2 is evaluated (block 170). If it has a low number of pixels, the exposure is "ok" (block 172); and if not, the condition is overexposed (block 174). If the region 3 (block 166) analysis shows the number of pixels below the low limit, region 4 is evaluated for a high number of pixels (block 176). If it has a high number above a preset level, the exposure is "ok" (block 178). Otherwise, the condition is underexposed (block 180).

Figure 8:
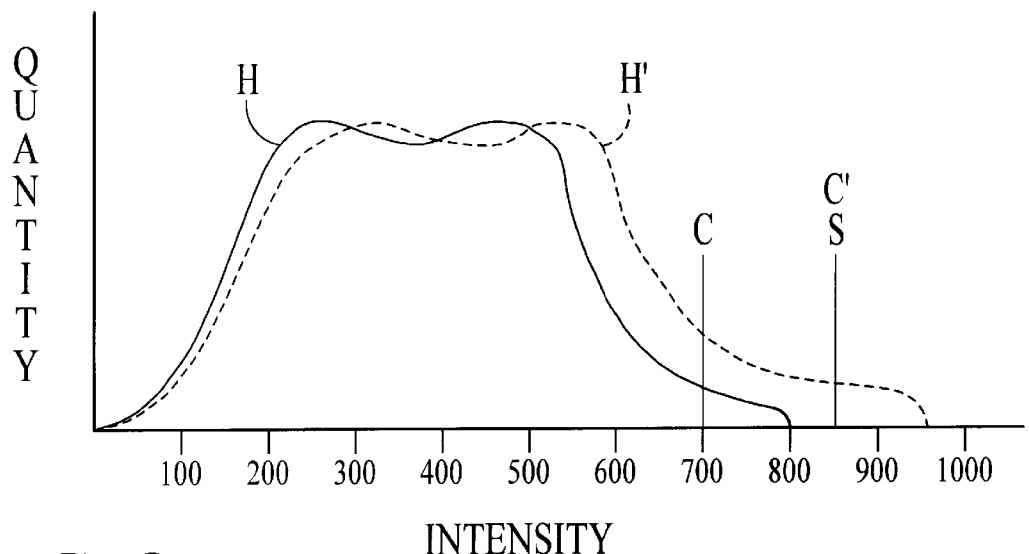
FIG. 8 is a more realistic histogram before and after scaling.

If the analysis indicates that nearly all the pixels have intensities in region 1, the exposure is termed "low clipping" or "low clip". If nearly all of the pixels have intensity in region 5, this would be high clipping (high clip). If neither low or high clipping exists, the analysis proceeds to blocks 78 or 80 in FIG. 3. Referring again to the simplified example of FIGS. 5 and 6, and to FIG. 8, the scaling operations performed in blocks 78 and 80 can be more fully understood. The solid line bar graph of FIG. 6A is evaluated according to block 72 explained above, and the condition would be noted as under exposed. A vertical line 148 (FIG. 6A) is marked showing the location of a value S equal to 850. S represents a point on a curve of "input light intensity" versus "output" of the image optical pickup 30 (curve not shown) where the curve becomes nonlinear, i.e. where the pickup begins to saturate, a condition indicative of excessive light input. A value "C" is also noted in FIG. 6A, marked with a line 150 as the value 800. The value "C" is supposed to be the point on the distribution of pixel intensities above which lie 0.5% of the pixels. This point is not clear in FIG. 6A because there are only 25 total pixels and 0.5% is less than one. For illustrative purposes, it is placed on the value 800 which includes the pixel of greatest intensity. According to a preferred embodiment of the present invention, a scaling factor S/C is defined, where S is as defined above, and C is the above defined value for a given distribution of unscaled pixels. The factor S/C is estimated by the processor 12 and used in the cases of blocks 78 and 80 to either multiply the first flash energy to obtain an estimated final flash energy for acceptable exposure, or to adjust the camera parameters if ambient light is the source. For example, in FIG. 6A, the ratio of S/C=850/800=1.0625. For reference, FIG. 6B is a table giving the quantities and intensities before and after scaling for FIG. 6A. Multiplying a first flash energy by the factor S/C and activating the flash would result in a pixel intensity distribution as shown by the "x"'s in FIG. 6A, with a bar graph as indicated by the dashed lines. Note that the dashed lines are displaced horizontally from the solid lines so they can be seen, but in fact they are horizontally representative of the same intensity. Also note that the scaled plot has a pixel at the value S equal to 850. A more realistic distribution of pixels might be more instructive at this point, and such a distribution is shown in FIG. 8. The solid curve "H", represents an original distribution resulting from a first flash. The point "C" at intensity 700 is supposed to represent the intensity point above which 0.5% of the pixels lie. The dashed curve "H" represents the plot of the scaled intensities which should result if the pixels represented by the solid curve H are multiplied by the factor S/C. In the case of FIG. 8, the value of S/C is S/C=850/700. Note the area above S=850 in the dashed curve. It should represent 0.5% of the total number of pixels. A reverse process with an S/C less than unity would result if the point C were initially above the point S, i.e. S/C <1.

Figure 9:
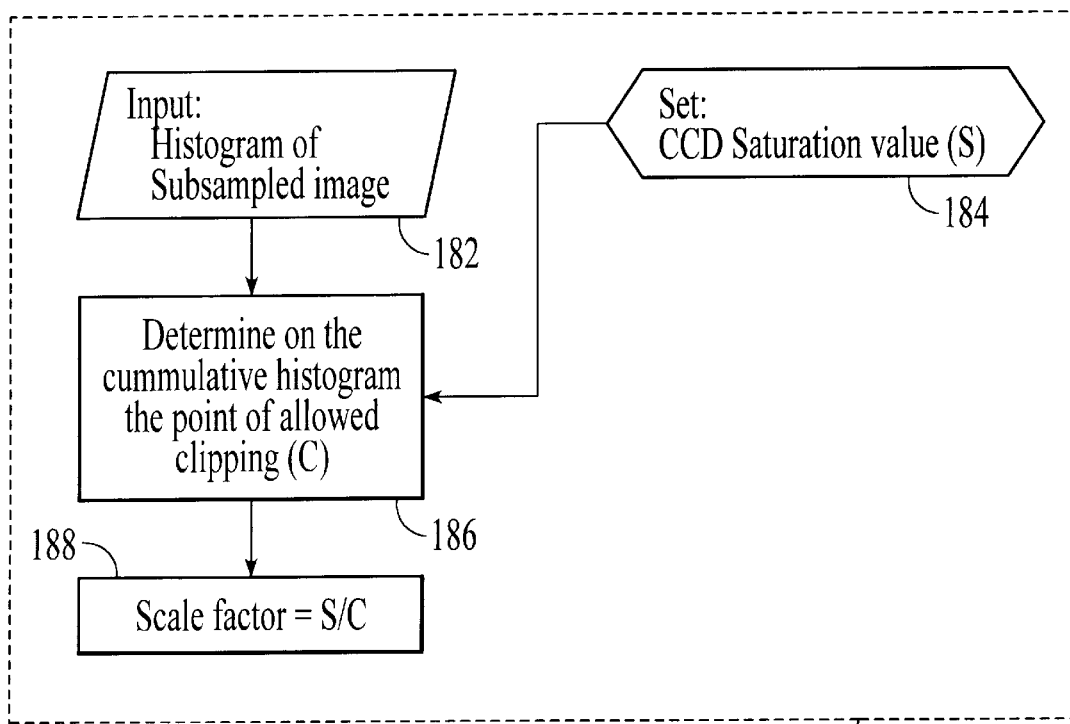
FIG. 9 is a block diagram showing the method of determining a scaling factor.

The scaling processes of blocks 78 and 80 are illustrated in block form in FIG. 9. Block 182 indicates the need for the histogram of the sampled image from block 72. Block 184 describes the need of the value S. Block 186 includes the operation of finding the point C on the histogram, above which 0.5% of the pixels lie. Block 188 gives the ratio of S/C as the scaling factor.

Figure 10:
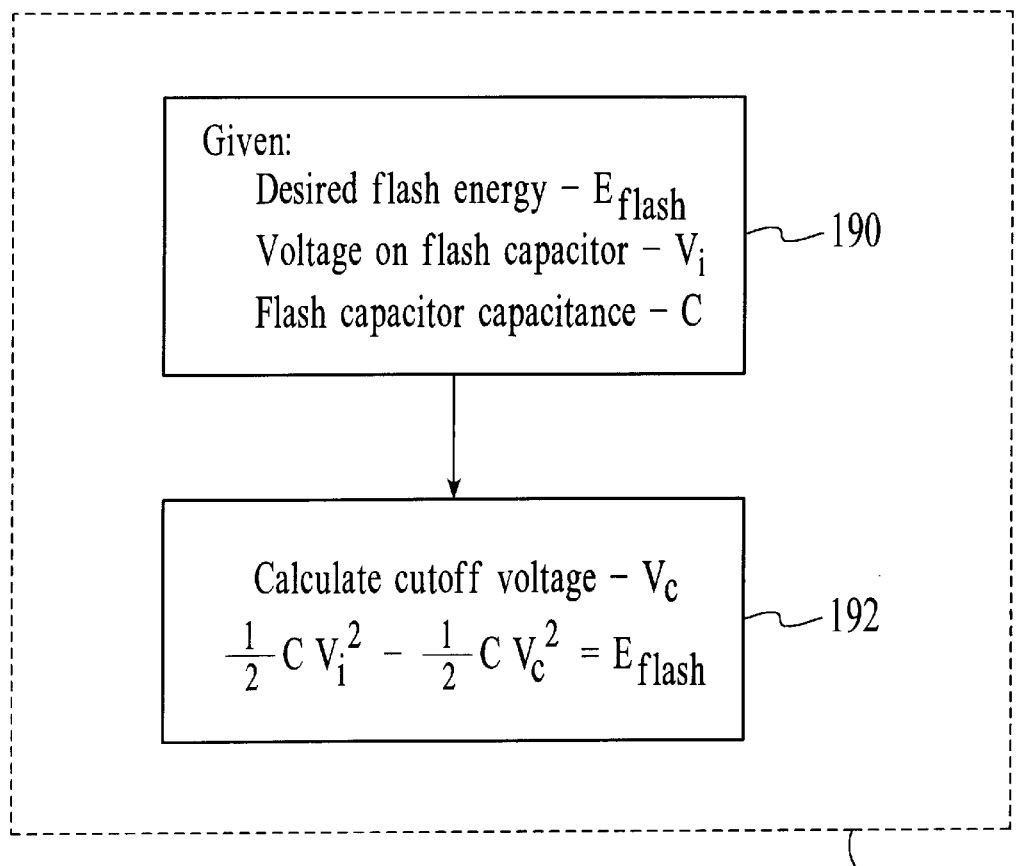
FIG. 10 is a block diagram illustrating the determination of flash capacitor cutoff voltage.
Figure 11:
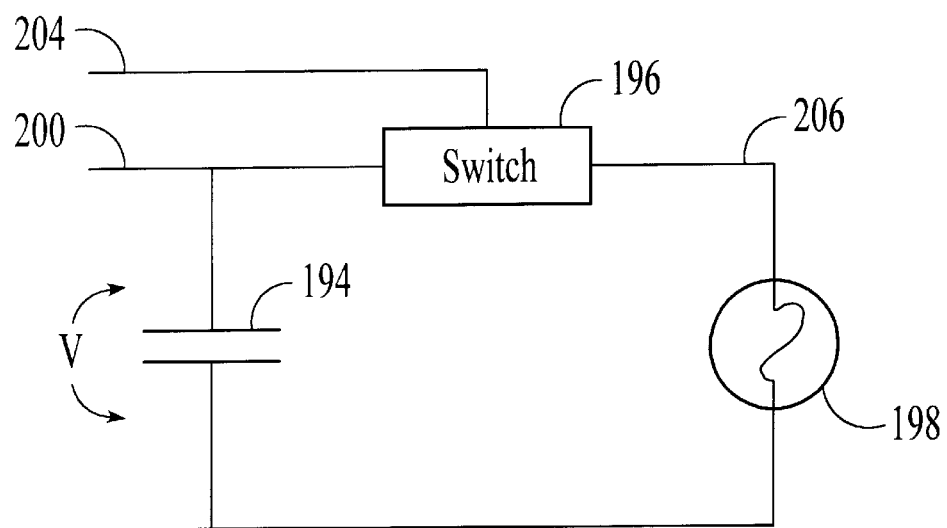
FIG. 11 is a schematic of a flash circuit.

Referring now to FIGS. 10 and 11, the operations performed according to the "activate light source" blocks 92 and 84 can be more fully understood in the case when the flash is used. Block 190 defines the inputs required. These are the desired flash energy "$E_{flash}$", the voltage on the flash capacitor "Vi", and the value of the flash capacitor "C". The capacitance "C" of the flash capacitor is a constant, and is a predetermined, preprogrammed value. The desired flash energy "$E_{flash}$" is determined as described in relation to blocks 78 or 80, depending on whether the result of the first flash was a condition of over or under exposure, and is $E_{flash}$=S/C ($E_1$) where $E_1$ is the previous flash. $E_1$ is the energy of the first flash for the activate blocks 92 and 84. The determination of S/C was explained above for blocks 78 and 80. When a correct exposure condition is the result of the first flash, the value of S/C is unity.

In the case where high or low clipping results from first flash or a first sampled ambient light, the scaling procedure of blocks 92 and 84 is not used. In these cases the scaling factor is a predetermined setting for flash operation, either ½ for high clipping or 2 for low clipping as indicated in blocks 74 and 76, although other values are included in the spirit of the invention. The activate flash blocks 92 and 84 also define the operation of sensing the voltage Vi prior to a flash.

With the above discussed values of $E_{flash}$, Vi and C, the processor 12 performs the calculation indicated in block 192 of FIG. 10 for Vc. Vc is the value of the flash capacitor voltage at which point the desired flash energy is expended in the flash unit. Solving the equation yields $$Vc = \frac{2}{C}\sqrt{\frac{1}{2}CV_i^2 - E_{flash}}$$

The flash operation described above is more fully explained in reference to FIG. 11. The figure shows a capacitor 194, switch 196 and flash bulb 198 arrangement. The voltage V across the capacitor terminals 200 and 202 is monitored. The value of Vi prior to a flash, as described above is measured and used in the calculation of a lesser value of voltage Vc at which point the capacitor 194 will have discharged the desired amount of energy to the flash bulb 198. The transfer of energy from the capacitor 194 to bulb 198 begins when a signal on line 204 causes switch 196 to connect line 200 to line 206 to the bulb 198. When the voltage between lines 200 and 202 (across capacitor 194) is sensed to be equal to Vc, a second signal is applied on line 204 causing switch 196 to disconnect line 200 from line 206.

Figure 12:
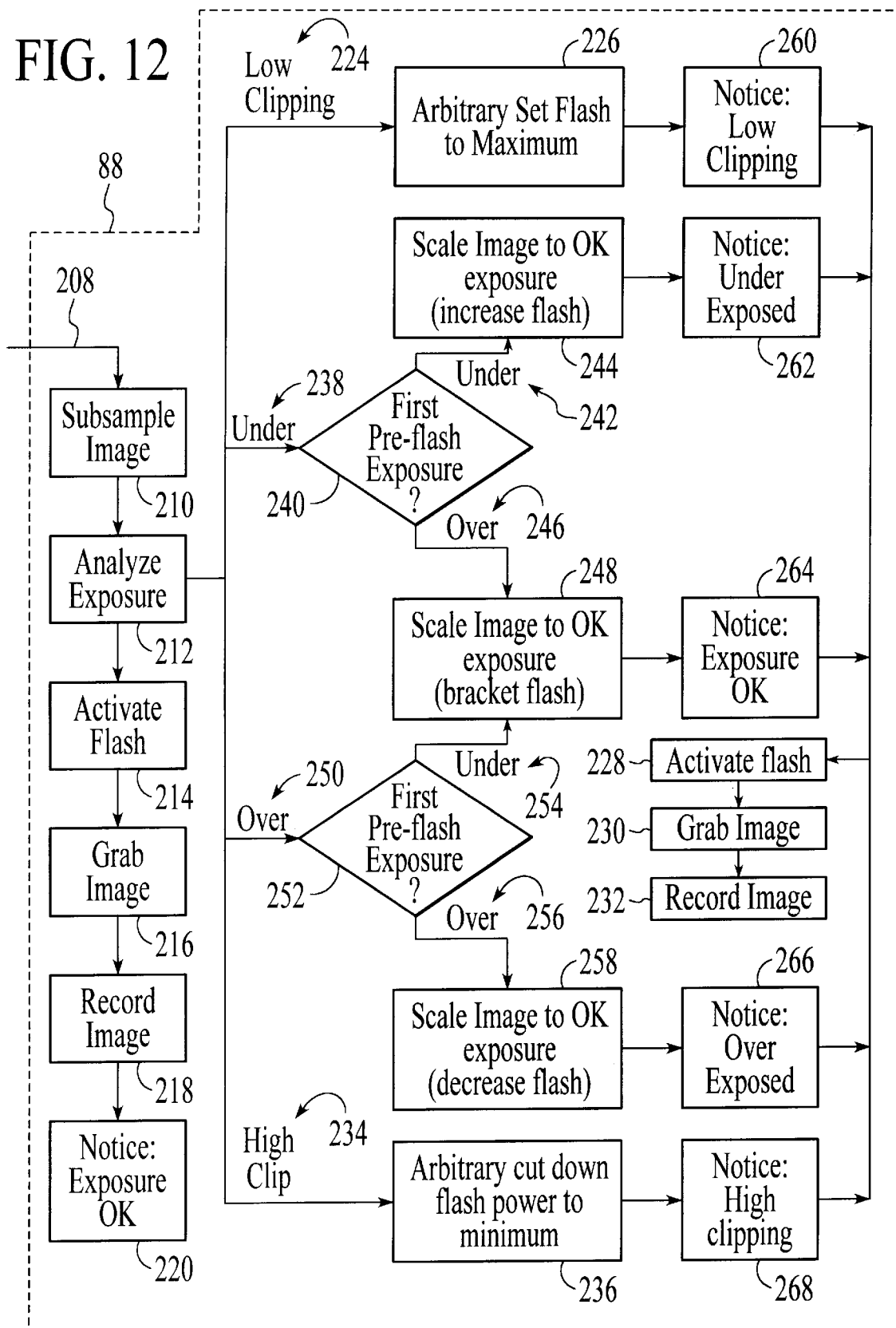
FIG. 12 is a detailed block diagram showing the analysis of the image resulting from activation of a second flash.

Referring to FIG. 12, there is shown a block diagram detailing the operations indicated by the second exposure analysis block 88 of FIG. 3. As discussed in reference to FIG. 3, if the exposure resulting from the first flash or first ambient light sample is either high or low clipping, a second flash or second ambient light sampling is performed of either lower or higher energy respectively for the flash, or adjusted parameters for the ambient light. This flash or sampling, described above in reference to block 84, provides an adjusted light to grab an image (block 86) which is analyzed according to block 88.

According to FIG. 12, the grabbed image (block 86, FIG. 3) is passed as indicated by arrow 208, and is sampled (block 210) and then examined according to the "analyze exposure" block 212. Blocks 210 and 212 define the same operations on the image data of the second flash or second sample as blocks 71 and 72 perform on the image data from the first flash or first sample. Similarly, if the result of the analysis is a determination that the exposure is correct, the sequence of activities defined by blocks 214–220 is identical to that of blocks 92–96 of FIG. 3. This is in response to a correct exposure resulting from the first flash or first ambient light sample. The additional block 220 indicates the option of supplying a notice to the operator that the exposure is okay. This notice can be in any of a variety of forms known to those skilled in the art, such as a light bulb of any color, or LED read out, etc. In the event the second flash results in low clipping (224), the processor 12 sets the flash to a maximum intensity as indicated by block 226. The flash or sample is then activated (block 228), the image is grabbed 230 and recorded 232. Similarly, if the second flash or second sample yields a high clip condition 234, the processor 12 directs the flash to a minimum (236). In the case where the light source was ambient light, the parameters are set for minimum light. The flash or sampling is then activated (228), the image grabbed (block 230) and recorded (232).

If the result of the second flash or second ambient sample is a condition of under exposure (238) meaning a condition not severe enough to be low clipping, and if the result of the first flash (240) or first sampling is under exposure 242, the second flash or sampling is scaled with a scaling factor S/C as indicated by block 244. The process of determining the scale factor S/C is the same as that described above in reference to block 80 of FIG. 3. The flash or sampling is then activated (228). In the case of a flash, the energy is set to a level equal to $E_2$(S/C) where $E_2$ is the second flash energy and S/C is the scaling factor. In the case of ambient light, the parameters of the last sampling are scaled to adjusted parameters using the factor S/C and an optional look-up table. The image is then grabbed 230 and recorded 232. Similarly, if the first result is "over exposure" (246), the preferred embodiment simply scales the second flash energy level or the camera parameters for ambient light (block 248) by determining the scale factor S/C. The determination of the scale factor S/C is again done in the same way as that described in relation to block 80 of FIG. 3.

In the case where the analysis of the sampled image of the second flash results in a condition of over exposure (250), and the result of the first flash (252) is under exposure (254), the second flash energy is scaled by the value S/C (block 248) to obtain the final flash energy. Also, if the first flash is over exposed (256), the second flash energy is again scaled (block 258) by the value S/C for final flash energy. Similarly for an ambient light source, the camera parameters are scaled from the parameters used in the second light sampling. The scaling operations in blocks 244, 248 and 258 are all similar to the scaling operations of blocks 78 and 80 as described in reference to FIG. 3. The only difference is that the scaling blocks of FIG. 12 scale the second flash energy or second camera parameters rather than the first. Also, it should be pointed out that scaling the second flash energy/parameter is done for simplicity in the cases where the second exposure image is under exposed and the first image is over exposed (ref. 238 and 246), and the case when the second image is over exposed and the first is under exposed (refs. 250 and 254). Alternate embodiments of the invention include exposure methods of scaling in block 248 when the first and second exposure bracket the correct exposure. For example, in the case where the first exposure results in under exposure and the second results in over exposure, a weighted average could be used. For the flash case, an example could be to assume a final flash energy $Ew=A(E_2-E_1)-E_1$ where A is a preset fraction between zero and one, the selected value depending on the estimated accuracy of the second flash. For example, it would normally be assumed that the second flash energy is closer to correct than the first and a choice of A=0.7 might be selected. Other weighted averages are also included in the spirit of the present invention.

The "Notice" blocks 260–268 define an optional visual or recorded message to the operator of the particular exposure condition existing when a picture is taken.

Although a preferred embodiment of the present invention has been described above, it will be appreciated that certain alterations or modifications thereon will be apparent to those skilled in the art. It is therefore that the appended claims be interpreted as covering all such alterations and modifications that fall within the true spirit and scope of the invention.

What is claimed is:

1. A flash method operable each time a flash picture is taken with a digital camera, said method comprising performing the following steps with the camera each time the camera takes a flash picture:
   (a) activating a flash with a flash energy lower than the energy required for an acceptable final flash energy level for achieving a correct exposure;
   (b) grabbing an image of a subject located a distance from said camera to create image intensity data;
   (c) analyzing said image intensity data to determine a flash degree of exposure, wherein the analyzing does not require knowledge of said distance and said analyzing including
      (i) creating a histogram of quantity of said image intensity data versus intensity;
      (ii) preparing a bar graph with a multiplicity of regions from said histogram; and
      (iii) evaluating the quantity of data in each said region of said bar graph;
   (d) calculating a subsequent flash energy level to achieve a corrected degree of exposure wherein said calculating includes scaling said image intensity data to determine a scaling factor to multiply times said flash energy to calculate a final acceptable flash energy if said degree of exposure is under exposed or over exposed, and wherein said scaling said image intensity data includes
      (i) evaluating said histogram to determine a first intensity level above which a predetermined percentage of said intensity data lie; and
      (ii) dividing a predetermined intensity level selected as a level at which said grabbing to create image intensity data becomes a non-linear, by said first intensity level to create said scaling factor.

2. A flash method operable each time a flash picture is taken with a digital camera, said method comprising performing the following steps with the camera each time the camera takes a flash picture:
   (a) activating a flash with a flash energy lower than the energy required for an acceptable final flash energy level for achieving a correct exposure;
   (b) grabbing an image of a subject located a distance from said camera to create image intensity data;
   (c) analyzing said image intensity data to determine a flash degree of exposure wherein the analyzing does not require knowledge of said distance;
   (d) calculating a subsequent flash energy level to achieve a corrected degree of exposure, wherein said calculating includes calculating a weighted average of a first energy level of a flash which resulted in under exposure, and a second energy level which resulted in over exposure to obtain an estimated final flash energy level.

3. A flash apparatus operable each time a flash picture is taken with a digital camera, said apparatus comprising:
   (a) means for activating a flash with a flash energy lower than the energy required for an acceptable final flash energy level for achieving a correct exposure;
   (b) means for grabbing an image of a subject located a distance from said camera to create image intensity data;
   (c) means for analyzing said image intensity data to determine a flash degree of exposure, wherein the analyzing does not require knowledge of said distance;
   (d) means for calculating a subsequent flash energy level to achieve a corrected degree of exposure wherein said means for calculating includes means for scaling said image intensity data to determine a scaling factor to multiply times said flash energy to calculate a final acceptable flash energy if said degree of exposure is under exposed or over exposed wherein said means for scaling said image intensity data includes
      (i) means for evaluating said histogram to determine a first intensity level above which a predetermined percentage of said intensity data lie; and
      (ii) means for dividing a predetermined intensity level selected as a level at which said grabbing to create image intensity data becomes non-linear, by said first intensity level to create said scaling factor;
   (e) means for repeating steps (a) through (d) until an acceptable final flash energy level for achieving a correct exposure is determined; and
   (f) means for activating a flash at the determined acceptable final flash energy;
   wherein the apparatus is integrated with the camera and operates each time the camera takes a flash picture.

4. A flash apparatus operable each time a flash picture is taken with a digital camera, said apparatus comprising:
   (a) means for activating a flash with a flash energy lower than the energy required for an acceptable final flash energy level for achieving a correct exposure;
   (b) means for grabbing an image of a subject located a distance from said camera to create image intensity data;

(c) means for analyzing said image intensity data to determine a flash degree of exposure, wherein the analyzing does not require knowledge of said distance;

(d) means for calculating a subsequent flash energy level to achieve a corrected degree of exposure wherein said means for calculating includes means for calculating a weighted average of a first energy level of a flash which resulted in under exposure, and a second energy level to obtain an estimated final flash energy level;

(e) means for repeating steps (a) through (d) until an acceptable final flash energy level for achieving a correct exposure is determined; and (f) means for activating a flash at the determined acceptable final flash energy;

wherein the apparatus is integrated with the camera and operates each time the camera takes a flash picture.

* * * * *